(12) United States Patent
Kurosawa

(10) Patent No.: US 7,409,475 B2
(45) Date of Patent: Aug. 5, 2008

(54) SYSTEM AND METHOD FOR A HIGH-SPEED SHIFT-TYPE BUFFER

(75) Inventor: Yasuhiko Kurosawa, Austin, TX (US)

(73) Assignee: Kabushiki Kaisha Toshiba, Tokyo (JP)

( * ) Notice: Subject to any disclaimer, the term of this patent is extended or adjusted under 35 U.S.C. 154(b) by 471 days.

(21) Appl. No.: 10/969,415

(22) Filed: Oct. 20, 2004

(65) Prior Publication Data

US 2006/0085576 A1    Apr. 20, 2006

(51) Int. Cl.
*G06F 3/00* (2006.01)
(52) U.S. Cl. .......................................... 710/52; 710/53
(58) Field of Classification Search ........................ None
See application file for complete search history.

(56) References Cited

U.S. PATENT DOCUMENTS

| | | | | |
|---|---|---|---|---|
| 4,667,313 | A | * | 5/1987 | Pinkham et al. ............. 365/240 |
| 5,341,371 | A | * | 8/1994 | Simpson ..................... 370/438 |
| 5,881,264 | A | | 3/1999 | Kurosawa |
| 5,978,822 | A | * | 11/1999 | Muwafi et al. .............. 708/209 |
| 6,418,515 | B1 | | 7/2002 | Kurosawa |
| 6,675,181 | B1 | * | 1/2004 | Tovey ......................... 708/209 |
| 2006/0123282 | A1 | * | 6/2006 | Gouldey et al. ............. 714/718 |

OTHER PUBLICATIONS

Henessey, J., et al., Computer Architecture, Chapters 3-8, 2002, ISBN 1-55860-596-7.
Henessey, J., et al., Computer Architecture, Chapters 4-8, 1996, ISBN 1-55860-329-8.
Culler, D., et al., Parallel Computer Architecture, Chapters 5-12, 1999, ISBN 1-55860-343-3.

* cited by examiner

*Primary Examiner*—Alford Kindred
*Assistant Examiner*—Eron J. Sorrell
(74) *Attorney, Agent, or Firm*—Law Offices of Mark L. Berrier

(57) ABSTRACT

Systems and methods for improving the performance of a multimedia processor system by dynamically evaluating the current performance of the system and, if necessary, updating the configurations of the individual processors to improve the performance of the system. One embodiment comprises a method implemented in a multiprocessor system, including evaluating the performance of a current set of configuration objects installed on the processors, selecting a preferred set of configuration objects, and replacing one or more of the configuration objects in the current set to conform the current set to the preferred set. The method may evaluate the performance of configuration objects according to user preferences and may select preferred configuration objects according to a selectable strategy that can, for example, favor unification or diversity in the types of preferred configuration objects.

27 Claims, 6 Drawing Sheets

SYSTEM AND METHOD FOR A HIGH-SPEED SHIFT-TYPE BUFFER

BACKGROUND

1. Field of the Invention

The invention relates generally to shift-type buffer systems and methods. More particularly, the invention relates to systems and methods for increasing the efficiency of processing data entries through a high-speed, shift-type buffer.

2. Related Art

Memory buffers are often used in digital circuits. Memory buffers can, for example, serve as temporary holding areas for data in transit from one device to another. Communicating devices often process data asynchronously, or at different rates. As a result, if one device is ready to transmit data and the receiving device is not yet ready to receive the data, the data is stored temporarily in the buffer connecting the devices until the receiving device is ready to accept the data. Communication between the devices could be difficult, inefficient, or even impossible without intermediate buffers.

One of the most common types of buffer is a first-in-first-out (FIFO). In a FIFO-type buffer, data entries exit/retire from the buffer in the order the data entries entered the buffer. A common implementation of a FIFO uses a read and a write pointer to monitor which data entry has just entered the buffer and which data entry is the oldest and will be the next to exit the buffer. As data entries enter and exit the buffer, the write and read pointers move in a cyclical manner to indicate the new incoming data entry and the next outgoing data entry.

The use of the read and write pointers allows implementation of a FIFO without requiring data entries to be moved from one location to another in the buffer. The use of read and write pointers, however, typically requires that that the data entry entering the buffer be made available to all the buffer locations. The write pointer then determines which location is enabled to store the data entry. Accordingly, the single data entry input to the buffer must be distributed, or fanned-out, in order for the single input to be made available to all the buffer locations. The fan-out circuitry may be deep and may require multiple clock cycles to propagate the input data, especially for a buffer with a large number of locations. Thus, read/write pointer FIFOs may not be suitable for applications where timing is critical, such as is the case with buffers used with high-speed processors.

Where timing is critical, a shift-type buffer may be used. In a shift-type buffer, data entries are initially stored in a first buffer location. As new data entries are ready to enter the buffer, the existing data entries are shifted through successive buffer locations to provide space for the new data entries. Although shift-type buffers allow new entries to be registered in the buffer more quickly than read/write pointer FIFOs, data entries in the buffer are continually required to shift/advance to new locations as new data entries enter the buffer.

Typically, a data entry exits the buffer if certain exit conditions are met. As digital circuits and devices become more complex, the time required to evaluate the exit conditions for data entries significantly increases. Moreover, additional time may be required in selecting the data entries that meet the exit conditions and removing the appropriate entries from the buffer. In some systems, the data is required to be encoded or processed. As a result, the time required for a data entry to exit the buffer may be significantly higher than the time required for a data entry to be registered in the buffer. For example, only one clock cycle may be required for a data entry to enter the buffer, but it may take two or more clock cycles to evaluate the exit conditions for a data entry to exit the buffer.

Conventionally, when it takes multiple cycles to evaluate the exit conditions and subsequently removed an entry from the buffer, it is necessary to delay the storing of any new entries in the buffer. This is because it is necessary to remove one of the existing entries in order to make space for the new entry. Thus, if it takes two cycles to remove an entry, an entry that is waiting to be stored in the buffer must also wait two or more cycles before it can be stored in the buffer. These delays decrease the efficiency with which the buffer operates.

It would therefore be desirable to provide systems and methods to avoid delays in processing buffer entries, particularly the delays that result from multiple-cycle evaluation of exit conditions and which cause the storing of new buffer entries to be delayed.

SUMMARY OF THE INVENTION

One or more of the problems outlined above may be solved by the various embodiments of the invention. Broadly speaking, the invention includes systems and methods for monitoring the shifting of data entries within a shift buffer while data entries are being evaluated and taking these shifts into account when removing entries from the buffer. The evaluated exit conditions for each data entry in the buffer are then effectively "shifted" by an amount equal to the shifting of the data entries. Put another way, the evaluation of the exit conditions for a particular data entry effectively follows the data entry, rather than being associated with a buffer location which may no longer contain the data entry.

One embodiment of the present invention is implemented by monitoring the shifting of each data entry in the buffer during each clock cycle. In an embodiment where the evaluation and application of the exit conditions is performed in two clock cycles while data entries enter the buffer every one cycle, shifting history for the data entries is retained for one clock cycle. Exit conditions corresponding to the data entry having the highest priority may first be considered. In one embodiment, the oldest data entry has the highest priority.

After the exit conditions have been evaluated, the exit conditions are matched with the corresponding data entries according to the data entry's shifting history. If the data entry did not shift locations in the buffer during the last clock cycle, the exit conditions result for a particular buffer location corresponds to the data entry currently stored in the buffer location. If, on the other hand, the data entry did shift locations during the last clock cycle, the exit conditions result for the buffer location corresponds to the data entry in the next buffer location. The shifting of the data entry by one location in the buffer while the exit conditions were being evaluated is thereby taken into account.

Similarly, if the evaluation and application of the exit conditions takes three clock cycles, data entry shifting history is retained for two clock cycles. To obtain the exit conditions result for a particular data entry, the exit conditions results are shifted by an amount equal to the number of times the data entry shifted locations in the data buffer during the last two clock cycles. A similar procedure can be followed for any number of clock cycles.

In another embodiment, bypass logic may be used to determine whether buffer exit conditions are in effect. If buffer exit conditions are not in effect, the buffer may be completely bypassed. Alternatively, the bypass logic may determine whether the buffer is empty and whether all the buffer exit conditions are true. If the buffer is empty and all the buffer exit conditions are true, the bypass logic may designate the data entry as a "location 1 only" data entry and may send the data entry directly to the first location in the buffer. The data entry then directly exits the buffer during the next clock cycle. Since all of the buffer exit conditions are true, no exit conditions need to be further evaluated, and the first buffer location is used as a pipeline station for encoding or processing.

In another embodiment, a method is implemented in a shift buffer having a plurality of buffer locations for storing data entries. The method includes evaluating exit conditions for one or more of the buffer locations and corresponding data entries, enabling the data entries to shift in the shift buffer, selecting a first buffer location for which evaluation of the corresponding exit conditions indicates a corresponding first data entry should be removed from the shift buffer, determining whether the first data entry has shifted to a second buffer, and removing the first data entry from the first buffer location if the first data entry has not shifted and removing the first data entry from the second buffer location if the first data entry has shifted.

An alternative embodiment of the invention comprises a method for providing a shift buffer having buffer locations for storing data entries. Furthermore, the method evaluates exit conditions for a subset of the data entries in the shift buffer and obtains exit conditions results for the subset of the data entries. To track the location of the data entries in the buffer, shift numbers are determined for the subset of the data entries, the shift numbers being the number of locations by which each of the subset of data entries shifted in the shift buffer during the evaluating of the exit conditions. Then, for a considered data entry, the exit conditions results are shifted by the shift number corresponding to the considered data entry, thereby identifying an exit conditions result corresponding to the considered data entry.

Yet another alternative embodiment comprises a system having a shift buffer which has a plurality of buffer locations for storing data entries and exit conditions logic coupled to the shift buffer for evaluating exit conditions for a subset of the data entries in the shift buffer and for obtaining exit conditions results for the subset of the data entries. In addition, the system has shift logic coupled to the shift buffer and configured to determine shift numbers for the subset of the data entries, the shift numbers being the number of locations each of the subset of data entries shifted in the shift buffer during the evaluating the exit conditions. Finally, the system has shifted exit condition logic coupled to the exit conditions logic and to the shift logic and configured, for a considered data entry, to shift the exit conditions results by a shift number corresponding to the considered data entry, thereby identifying an exit conditions result corresponding to the considered data entry.

Numerous additional embodiments are also possible.

The various embodiments of the present invention may provide a number of advantages over the prior art. For example, with respect to the embodiment described above, the system and method enable the buffer to operate at high speed without having to slow down to the rate at which exit conditions are being evaluated. Similar advantages may be provided in other embodiments involving other types of agents and resources.

BRIEF DESCRIPTION OF THE DRAWINGS

Other objects and advantages of the invention may become apparent upon reading the following detailed description and upon reference to the accompanying drawings.

Figure 1:
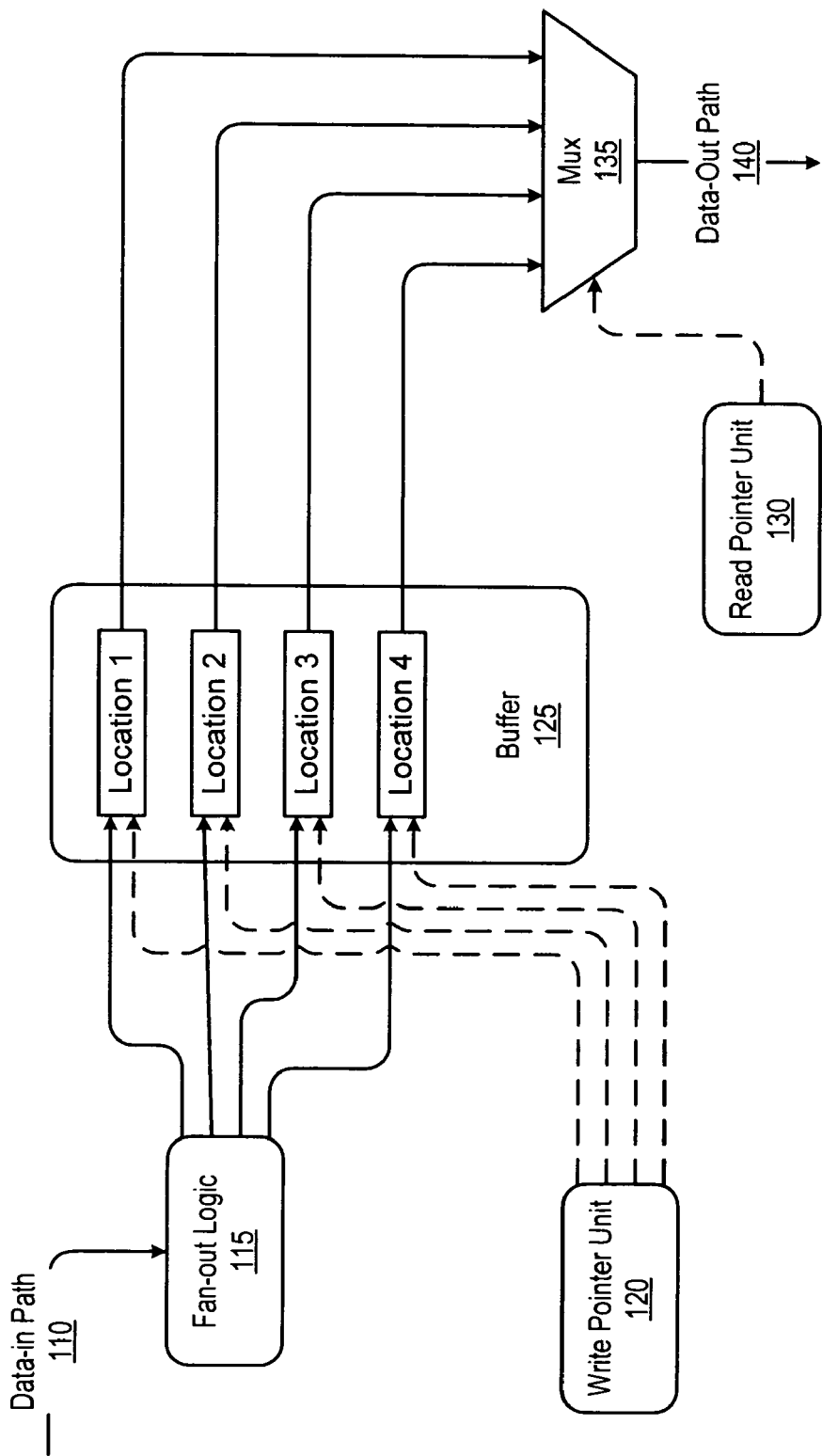
FIG. 1 is a functional block diagram illustrating a write/read pointer buffer with fan-out logic at the input of the buffer in accordance with the prior art.

While the invention is subject to various modifications and alternative forms, specific embodiments thereof are shown by way of example in the drawings and the accompanying detailed description. It should be understood, however, that the drawings and detailed description are not intended to limit the invention to the particular embodiments which are described. This disclosure is instead intended to cover all modifications, equivalents and alternatives falling within the scope of the present invention as defined by the appended claims.

DETAILED DESCRIPTION OF PREFERRED EMBODIMENTS

One or more embodiments of the invention are described below. It should be noted that these and any other embodiments described below are exemplary and are intended to be illustrative of the invention rather than limiting.

Broadly speaking, the invention includes systems and methods for monitoring the shifting of data entries within a shift buffer while data entries are being evaluated. The evaluated exit conditions for each data entry in the buffer are then "shifted" by an amount corresponding to the shifting (number of locations) within the buffer of the corresponding data entry thereby compensating for the shifting of the data entry while the data entry was being evaluated.

While the invention is widely applicable to different types of systems, it is impossible to include all of the possible embodiments and contexts of the invention in this disclosure. The present disclosure therefore focuses on a few exemplary embodiments that are implemented in multi-processor computing systems. It should be noted that these embodiments are intended to be illustrative rather than limiting. Upon reading this disclosure, many alternative embodiments of the present invention will be apparent to persons of ordinary skill in the art. All these alternative embodiments are within the scope of the appended claims.

One embodiment of the present invention is implemented by monitoring the shifting of each data entry in the buffer during each clock cycle. In an embodiment where the evaluation and application of the exit conditions is performed in two clock cycles while data entries enter the buffer every one cycle, shifting history for the data entries is retained for one clock cycle. Exit conditions corresponding to the data entry having the highest priority are the first to be considered. In one embodiment, the oldest data entry has the highest priority.

After the exit conditions have been evaluated, the exit conditions result is matched with the corresponding data entry according to the data entry's shifting history. If the data entry did not shift locations in the buffer during the last clock cycle, the exit conditions result corresponds to the data entry currently stored in the buffer location associated with the result. If, on the other hand, the data entry did shift locations during the last clock cycle, the exit conditions result corresponds to the data entry stored in the next buffer location. The shifting of the data entry by one location in the buffer while the exit conditions were being evaluated is thereby taken into account.

Similarly, if the evaluation and application of the exit conditions takes three clock cycles, data entry shifting history is retained for two clock cycles. To obtain the exit conditions result for a particular data entry, the exit conditions results are shifted by an amount equal to the number of times the data entry shifted locations in the data buffer during the last two clock cycles. A similar procedure can be followed for any number of clock cycles.

In another embodiment, bypass logic may be used to determine whether buffer exit conditions are in effect. If buffer exit conditions are not in effect, the buffer may be completely bypassed. Alternatively, the bypass logic may determine whether the buffer is empty and whether all the buffer exit conditions are true. If the buffer is empty and all the buffer exit conditions are true, the bypass logic may designate the data entry as a "location 1 only" data entry and may send the data entry directly to the first location in the buffer. The data entry then directly exits the buffer during the next clock cycle. Since all the buffer exit conditions are true, no exit conditions need to be evaluated, and the first buffer location is used as a pipeline station if the subsequent encoding or processing is required.

The embodiments of the invention that are described herein focus on implementations in multiprocessor systems. As noted above, these multi-processor systems do not limit the invention, but simply provide a context for specific embodiments of the invention. Just as these embodiments are illustrative rather than limiting of the invention, the particular terminology used in connection with these embodiments should be considered illustrative rather than limiting. For example, while some embodiments involve control of processors' access to a bus, these terms (e.g., processor, command, bus) are illustrative of more generic terms (e.g., agent, access, resource) that are used elsewhere in the disclosure and in the claims.

The various embodiments of the present invention may provide a number of advantages over the prior art. For example, the embodiments described above enable the buffer to operate at high speed without having to slow down to the rate at which data entries are stored in the buffer or removed from the buffer. Similar advantages may be provided in other embodiments involving other types of agents and resources.

Referring to FIG. 1, a functional block diagram illustrating a write/read pointer buffer with fan-out logic at the input of the buffer in accordance with the prior art is shown. Buffer 125 is configured to receive the data entries through data-in path 110, temporarily store the data entries, and output the data entries through data-out path 140. Buffer 125 is a first-in-first-out (FIFO) queue implemented with a write pointer and a read pointer. Buffer 125 operates by using the write pointer to indicate the next available buffer location and using the read pointer to indicate the next available buffer location to be output from the buffer. As a result, data entries in buffer 125 remain at the same buffer location until the data is discarded or output from buffer 125.

In this write/read pointer buffer implementation, the data received through data-in path 110 is made available to all the buffer locations. The appropriate buffer location where the data entry is to be stored is then selected using write pointer unit 120. Write pointer unit 120 asserts a signal to one of the buffer locations, thereby causing the data entry to be stored in that location. The remainder of the buffer locations simply retain the values that were previously stored therein.

Multiplexer 135 is configured to select which of the buffer locations is to be selected for removal from the buffer and to output the data entry in that location though data-out path 140. A data path exists from each of the entries of buffer 125 to multiplexer 130. The appropriate buffer location is selected according to the signal multiplexer 135 receives from read pointer unit 130. Read pointer 130 unit may determine which buffer location to select according to data priority (first-in-first-out priority, for example) and/or any other applicable exit conditions that may exist.

To make the data available to all the buffer entries, fan-out logic such as fan-out logic 115 is typically used. Fan-out logic 115 is necessary because the data signal provided on data-in path 110 typically is not strong enough to drive the logic for all of the buffer locations. The data signal is therefore passed through one or more operational amplifiers (op-amps) or inverters to strengthen the signal before it is distributed (fanned out) to the buffer locations. The fanout logic may be made by several buffers because a distributed buffer structure is faster.

Thus, fan-out logic 115 is configured to receive a single data entry and to provide the data entry to all the locations of buffer 125 (locations 1-4 as shown in the example of FIG. 1). The fan-out circuitry introduces additional time delays to the processing, especially in cases where the buffer has a large number of entries. This delay results from the processing of the signal by the op-amps/inverters. In applications where execution time is critical, this type of read/write pointer buffer may not be acceptable. It may therefore be desirable to use an alternative buffer configuration where the speed of the buffer is important.

Figure 2:
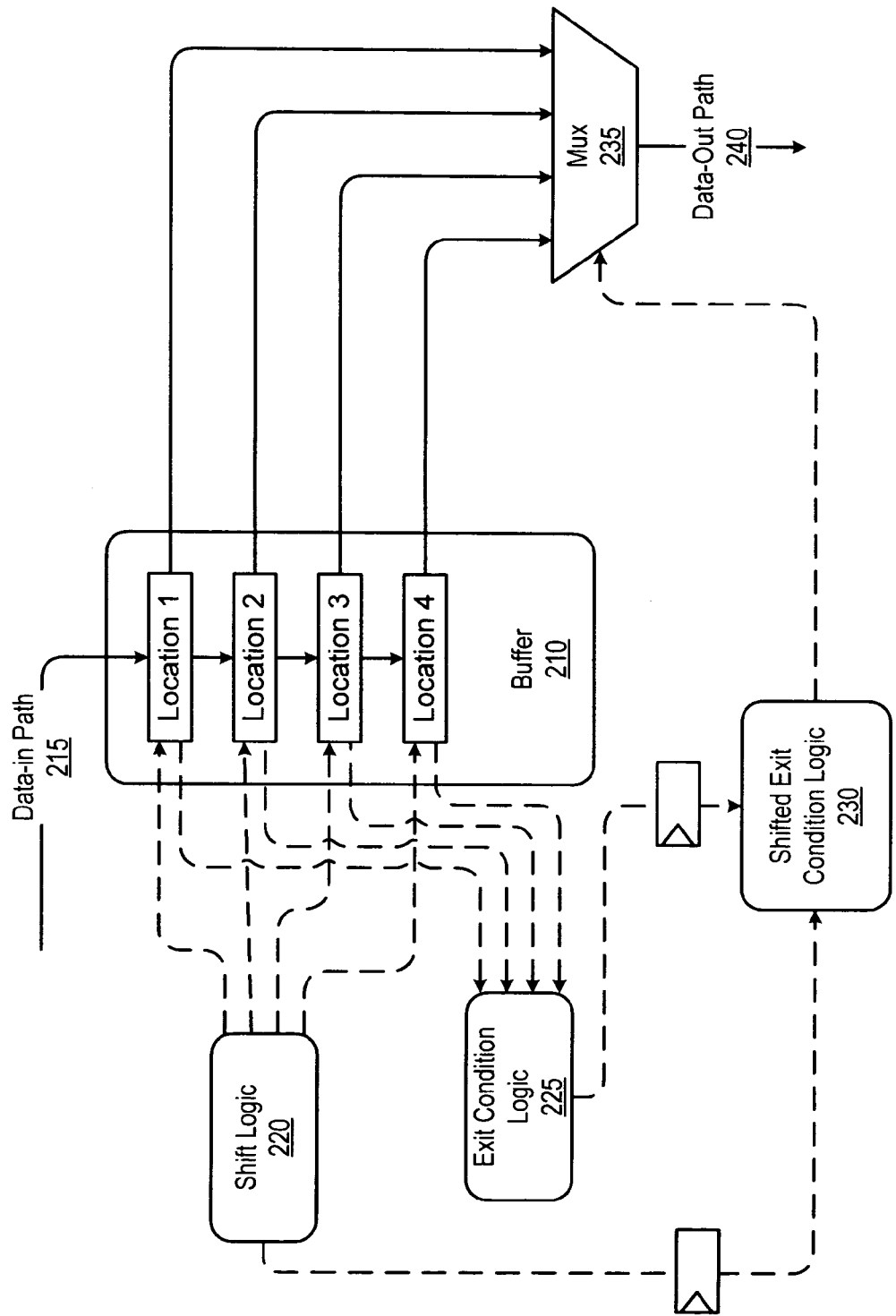
FIG. 2 is a functional block diagram illustrating a shift buffer having arbitration and shift logic for controlling the data output from the buffer in accordance with one embodiment.

Referring to FIG. 2, a functional block diagram illustrating a shift buffer having exit condition logic and shift logic for controlling the data output from the buffer in accordance with one embodiment is shown. Buffer 210 is configured to receive data entries though data-in path 215, temporarily store the data entries, and output the data entries through data-out path 240. Buffer 210 is configured to initially store all received data entries in the buffer's first location (Location 1). The data entries are then shifted "down" through the buffer (from location 1 to location 2 or from location 2 to location 3, for example) as new data entries are stored in the buffer. Because buffer 210 has one main data path for inputting data to the buffer, fan-out logic for distributing one input signal to many buffer locations is not required. This significantly reduces execution time.

Exit condition logic 225 is configured to monitor the data entries in buffer 210. Exit condition logic 225 is also configured to monitor the exit conditions corresponding to the data entries. Exit condition logic 225 evaluates the exit conditions for one or more of the data entries and, based upon the evaluation of the exit conditions, exit condition logic 225 determines which, if any, of the data entries is to be removed from buffer 210 and output through multiplexer 235.

In one embodiment, buffer 210 and supporting logic are part of a multiprocessor system. In this embodiment, buffer 210 is coupled to a bus that is in turn coupled to the processors. Buffer 210 is configured in this embodiment to temporarily store instructions or data for the processors and to forward the instructions or data to the processors in response to the processors signaling their availability.

In one embodiment, tokens are used to indicate the availability of the slave devices to receive entries from buffer 210.

In this embodiment, there are 16 different types of tokens, and each of the slaves processes data/instructions corresponding to a particular type of token. A token in this embodiment is represented by a set of sixteen bits, all of which are set to 0, except for one, which is set to 1. The type of the token is determined by which if the bits is set to 1.

In this embodiment, 16 bits are associated with buffer 210. Each of the 16 bits that is set to "1" indicates the presence of the corresponding type of token. For each token that is present, the corresponding processor in the system is available. In one embodiment, exit condition logic 225 may be configured to select a data entry to be output depending on the priority of the data entry in the buffer (FIFO priority, for example) and on whether the token corresponding to the destination processor indicates that the processor is available.

In one embodiment, a buffer is designed to store a new data entry and remove one data entry each clock cycle. In some cases, the exit condition logic may take more than one clock cycle to evaluate the exit conditions and to determine whether to select a particular data entry to be removed from the buffer. During the time exit conditions are being evaluated, a data entry may be shifted by one or more locations in buffer 210. This is because buffer 210 is a shift-type buffer and data entries are shifted as new entries enter the buffer.

It should be noted that, although the foregoing example is designed to store/remove a data entry each clock cycle while sometimes requiring more than one cycle to evaluate exit conditions, alternative embodiments may have varying time conditions. In these alternative embodiments, the desired amount of time between storing/removing successive data entries may be longer (e.g., two or more cycles,) and the exit condition evaluation logic may take more time (e.g., more than two or more cycles,) to evaluate the exit conditions for removal of a data entry.

Conventionally, when it takes longer for the exit condition evaluation logic to evaluate the appropriate exit conditions than the desired time between storage/removal of successive data entries, the storage/removal of the next data entry is delayed until the exit conditions are evaluated. This is necessary in conventional systems using shift buffers because, if the data entries are allowed to shift from one buffer location to another, the buffer logic is not aware of the location of the data entry which the evaluated exit conditions indicate should be removed. The shifting of the data entries must therefore be delayed so that the buffer logic can locate the data entry to be removed. The present embodiment therefore allows the data entries to shift and implements a mechanism to track the shifting of the data entries so that the appropriate entries can be removed from the buffer.

In order to avoid delaying the receiving of data entries into the buffer to allow for exit condition logic 225 to complete its task, shift logic 220 is introduced. Shift logic 220 is configured to monitor the shifting of each of the data entries in buffer 210 and to provide this information to shifted condition logic 230. Shifted condition logic 230 is configured to receive the results of the evaluation of the exit conditions from exit condition logic 225, as well as the shift results from shift logic 220, and to combine the results in order to determine whether a particular data entry is to be output from the buffer.

In one embodiment, shift condition logic 230 operates in the following manner. At cycle 0, evaluation of exit conditions for a data entry in buffer location i is initiated. Evaluation of the exit conditions is then completed. At cycle 1, the data entry is actually selected. If the evaluation indicates that the data entry should be removed from the buffer, shift condition logic 230 needs to know whether the data entry has shifted within the buffer. If the data entry has not shifted, the data entry at buffer location i is removed from the buffer. If the data entry has shifted, the data entry at buffer location i+1 is removed from the buffer. This assumes that the data entries in the buffer shift by either 0 or 1 buffer location each clock cycle.

The above example can be expanded to cover cases where the difference in time (clock cycles) between data entering into the buffer and the evaluation of the exit conditions result is more than one clock cycle. A more detailed example showing how the shifting data is combined with the evaluation of the exit conditions data is provided in FIG. 3 and corresponding text. Upon selecting a particular data entry for output, shifted condition logic 230 sends the appropriate signal to multiplexer 235, which selects the appropriate data entry and outputs the data entry through data-out path 240. In one embodiment, shift logic 220, exit condition logic 225, and shifted condition logic 230 may be implemented in one unit.

In one embodiment, this same type of evaluation is performed for each of the entries in the buffer. Thus, for each of a plurality of buffer locations, the evaluation of the data entry in the buffer location is initiated in one cycle and completed in the next cycle. When the evaluation is completed, the highest priority data entry is removed from the buffer. If the highest priority data entry was in buffer location i, either buffer location i or buffer location i+1 is removed, depending upon whether or not the data entry has shifted.

Figure 3:
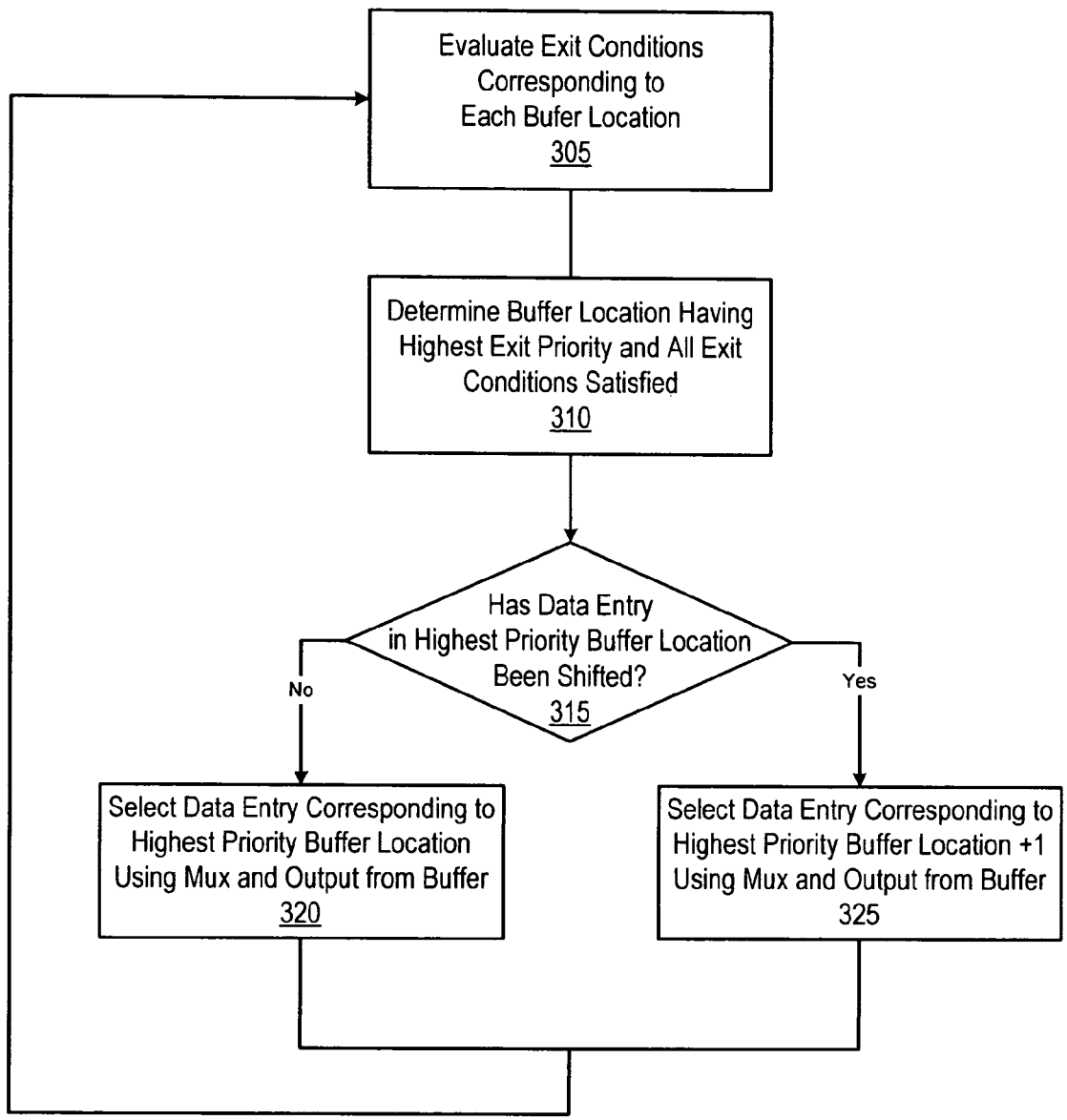
FIG. 3 is a flowchart illustrating a method for controlling data output from a shift buffer using shift and exit condition logic in accordance with one embodiment.

Referring to FIG. 3, a flowchart illustrating a method for controlling data output from a shift buffer using shift and exit condition logic in accordance with one embodiment is shown. The method of FIG. 3 begins with the evaluation of the exit conditions for each location in the buffer (block 305.) A determination is made as to whether the exit conditions result for the particular data entry in each buffer location is "true" (implying that the data entry is ready for existing the buffer.) Some of the entries may evaluate to true, while others may evaluate to "false."

At block 310, the buffer location with the highest priority is selected from among those buffer locations that evaluate to true and are therefore ready to be removed from the buffer. Typically, for a FIFO, shift buffer, the oldest data entry has the highest priority, which, in this case, is the data entry stored in the "lowest" buffer location. It should be noted that, in alternative embodiments, blocks 305 and 310 may be reversed, so that the highest priority buffer location is identified and then evaluated. The identification of priorities for the buffer locations and the evaluation of the corresponding exit conditions may be performed in parallel, or serially.

A determination is then made as to whether the data entry that was in the highest priority buffer location has shifted locations in the buffer during the last clock cycle (block 315.) In this embodiment, it is assumed that it takes two clock cycles for the exit conditions result to be evaluated and that it takes one clock cycle for new data to enter the buffer. While the exit conditions result is being determined for the data entry, the data entry can either remain in the same location in the buffer, or it can shift to the next location in the buffer (e.g., to make room for another data entry.)

If the data entry did not shift locations in the buffer, decision 315 branches to the "no" branch whereupon, at block 320, the highest priority buffer location is selected by a multiplexer so that the data entry exits the buffer. On the other hand, if the data entry did shift to the next location in the buffer, decision 315 branches to the "yes" branch whereupon, at block 325, the multiplexer selects the next buffer location after the highest priority buffer location ("highest priority buffer location+1") so that the data entry in this buffer location exits the buffer. In this manner, the multiplexer selects the buffer location that contains the data entry which was in the highest priority buffer location when evaluation of the exit conditions was initiated. The proper data entry is output from the buffer, whether the data entry shifted during the exit condition evaluation process or not.

After one of the buffer locations is selected by the multiplexer to be output from the buffer, processing loops back to block 310. The process illustrated in the figure is continually repeated to remove data entries from the buffer and thereby make room for new entries in the buffer. It should be noted that, in accordance with the examples described above, the illustrated process covers two cycles from initiating evaluation of the exit conditions to removal of a data entry from the buffer. Because it is desired to store and remove data entries at a rate of one per clock cycle, the process is started again before it is completed. Alternatively, the process may considered to have two simultaneously executing threads which are shifted in phase by one clock cycle.

Figure 4:
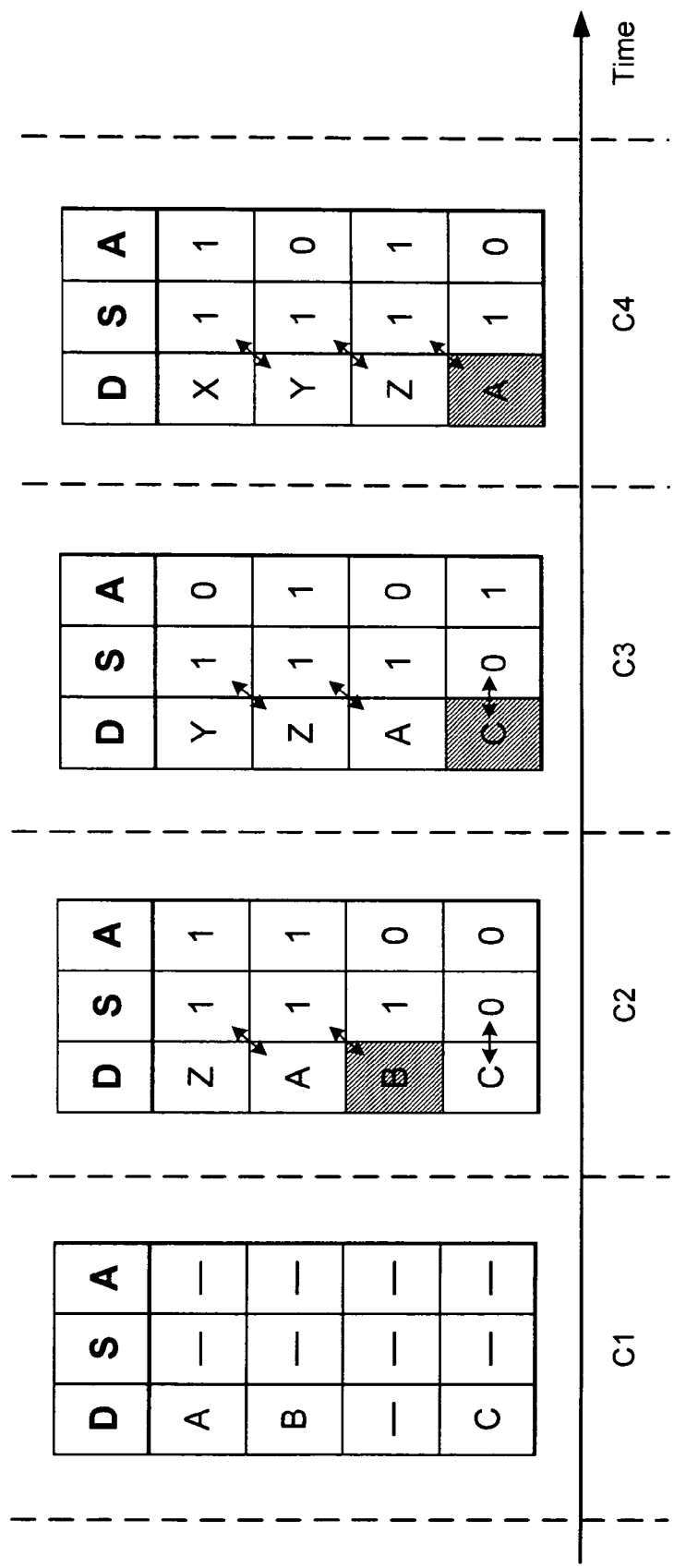
FIG. 4 is a diagram illustrating the state of a shift buffer, shift logic, and exit condition logic at different clock cycles in accordance with one embodiment.

Referring to FIG. 4, a diagram illustrating the state of a shift buffer, shift logic, and exit condition logic at different clock cycles in accordance with one embodiment is shown. In each table, the first column (D) contains the data entries stored at each of four buffer locations, the second column (S) represents the shift results corresponding to each of the buffer locations, and the third column (A) represents the exit conditions results corresponding to each of the buffer locations in the previous cycle. For this example, it is assumed that the buffer has four locations, that a new data entry enters the buffer every clock cycle, and that the evaluation of the exit conditions takes two clock cycles to complete.

At the first clock cycle (C1), the first two buffer locations contain data entries A and B, the third buffer location is empty, and the fourth buffer contains data entry C. At cycle C1, the results of the evaluation of the exit conditions as not shown in column A. If these results were shown, they would be based on the data entries as they were stored in the buffer locations in the previous clock cycle, since evaluation of the exit conditions requires two clock cycles to complete. Similarly, the shift results are not shown in column S, because they would be based on the data entries as they were stored in the buffer locations in the previous clock cycle.

At the second clock cycle (C2), data entries A and B are shifted to make room for new data entry Z which enters the buffer. As a result, the buffer now contains: Z, A, B, and C. The shift column indicates that the contents of the first and second buffer locations (which previously contained A and B) have shifted (indicated by 1's). The shift column also indicates that the data entry in the fourth buffer location (which previously contained C) did not shift locations from the previous clock cycle (indicated by a 0.)

To determine whether a particular data entry is to be selected for output, the highest priority buffer location is first selected. It is assumed in this example that the lower buffer locations have older data entries and higher priority. The highest priority buffer location is therefore the second buffer location, which has a 1 in column A at cycle 1 (the third and fourth buffer locations have exit condition results of 0, so they are ready to be considered for removal from the buffer.) Column S is then examined to determine whether the data entry stored in the second buffer location when the exit condition evaluation was initiated has shifted. There is a 1 in column S, so it is known that the data entry corresponding to the exit condition evaluation has shifted down by one buffer location, as indicated by the arrow. This data entry is data entry B. Data entry B is therefore selected to be removed from the buffer.

At the third clock cycle (C3), data entries Z and A to shift to a "lower" location in the buffer, allowing data entry Y to enter the buffer. As a result, the buffer now contains: Y, Z, A, and C. The shift column indicates that the contents of the first and second buffer locations (which previously contained Z and A) have shifted (indicated by 1's), while the data entry in the fourth buffer location (which previously contained C) did not shift from the previous clock cycle (indicated by a 0.) In the previous cycle, C2, the results of the exit condition evaluations show that the second and fourth buffer locations are ready to be removed from the buffer. The fourth buffer location is selected because it corresponds to a true exit conditions result and has the highest priority among the data entries having a "true" exit condition. Because the shift condition indication for the fourth buffer location is 0, the data entry corresponding to the exit condition evaluation result is still contained in the fourth buffer location. The data entry in this buffer location is therefore selected for removal from the buffer.

At the fourth clock cycle (C4), data entries Y, Z and A to shift to "lower" locations in the buffer, allowing data entry X to enter the buffer. As a result, the buffer now contains: X, Y, Z, and A. The shift column indicates that the data entries in all four buffer locations shifted from the previous clock cycle (indicated by 1's.) In cycle C4, the results of the exit condition evaluations show that the first and third buffer locations are ready to be removed from the buffer. The third buffer location is selected because it corresponds to a true exit conditions result and has the highest priority among the data entries having a "true" exit condition. Because the shift condition indicated in column S is a 1, the data entry in the next lower buffer location (data entry A) is selected to be removed from the buffer.

Figure 5:
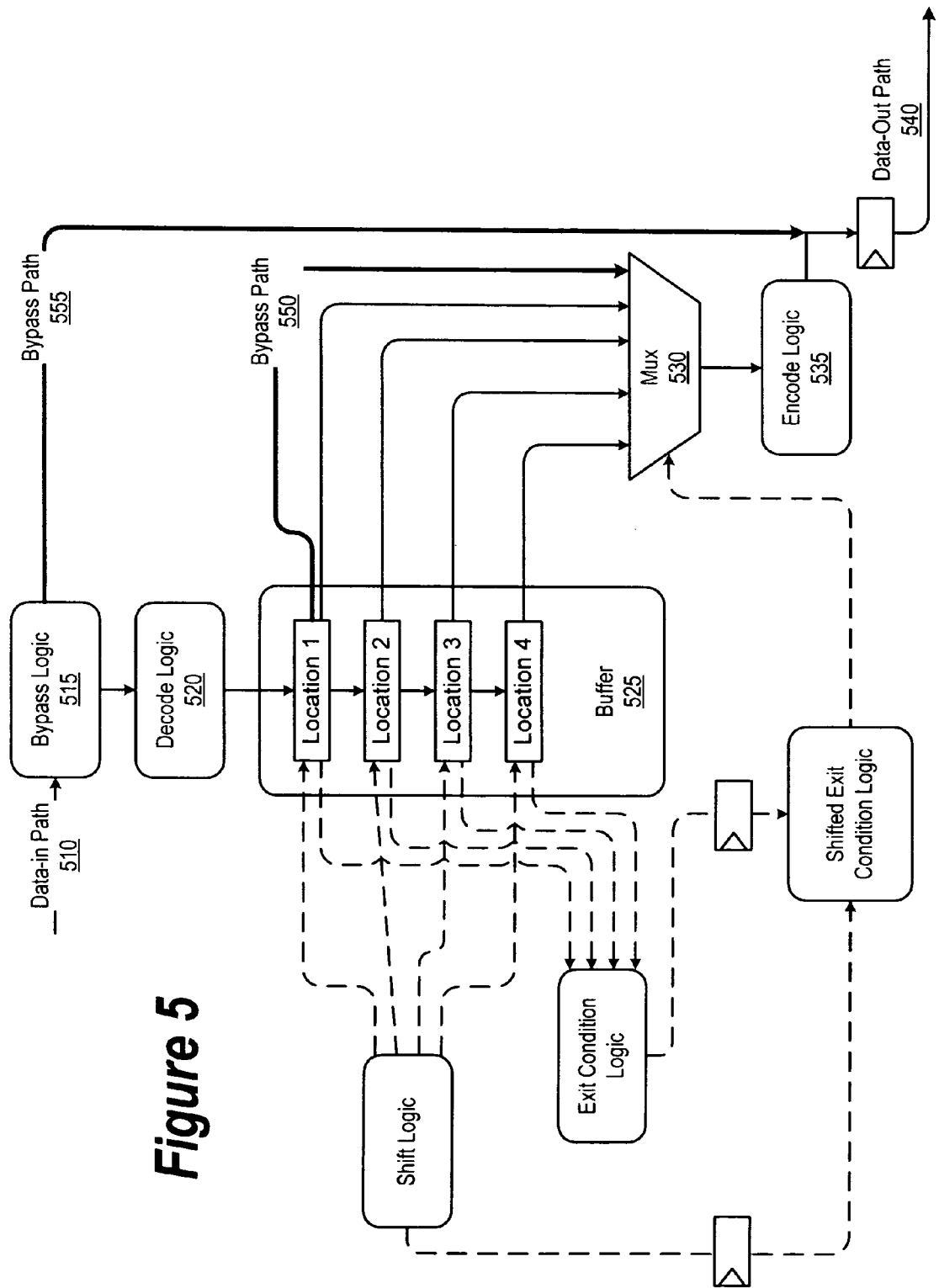
FIG. 5 is a functional block diagram illustrating a shift buffer having alternative data bypass paths in accordance with one embodiment.

Referring to FIG. 5, a functional block diagram illustrating a shift buffer having alternative data bypass paths in accordance with one embodiment is shown. Buffer 525 is configured to temporarily hold data entries until the data entries can meet one or more buffer exit conditions. When a data entry meets the buffer exit conditions, the data entry is selected through multiplexer 530 to exit the buffer.

In one embodiment, decode logic 520 is configured to assist in the evaluation of the buffer exit conditions. For example, if the data entries are bus commands to slaves, a token system may be set up to enable the determination of whether a particular slave is available to receive new bus commands. The processors may send tokens over a common bus, for example, to the buffer to inform the buffer whether the slaves are available to receive new bus commands. In this embodiment, decode logic 520 may be used to convert a destination address associated with each bus command to a corresponding token for the purpose of determining availability of each of the slaves. Similarly, encode logic 535 may be used to convert tokens associated with a bus command to a slave destination address before the bus command exits the buffer.

Bypass logic 515 is configured to receive a new data entry though data-in path 510 and to first determine whether buffer exit conditions are in effect. In an embodiment where the buffer exit conditions depend on the availability of a slave receiving the data entry, there may be instances where the buffer exit conditions are not in effect. For example, if all of the slaves are available to accept data entries from the buffer, a lone data entry in the buffer may immediately be sent to the appropriate processor. Alternatively, it may be possible to simply disable the buffer exit conditions.

If buffer exit conditions are not in effect, bypass logic 515 is configured to direct the data entry to bypass path 555, thereby bypassing buffer 525 as well as decode logic 520 and encode logic 535 and avoiding unnecessary processing.

If buffer exit conditions are in effect, bypass path 555 will not be used. There is an alternative bypass path, however. Bypass logic 515 is configured to determine whether buffer 525 is empty and whether all the buffer exit conditions are true (all the tokens are true, for example). If buffer 525 is empty and all the buffer exit conditions are true, bypass logic 515 is configured to designate the data entry as a "location 1 only" data entry and to send the data entry to decode logic 520. After the decoding by decode logic 520, the data entry advances to the first location in the buffer and then proceeds directly to multiplexer 135 through bypass path 550. The data entry finally goes through encode logic 535 and exits through data-out path 535. Since all of the buffer exit conditions are true, no exit conditions need to be evaluated, and the first buffer location is used as a pipeline station.

Finally, if buffer 525 is occupied, or if not all the buffer exit conditions are true (some of the tokens are not true, for example), bypass logic 515 sends the data entry on a normal path through buffer 525. That is, the data entry enters the buffer at location 1 and stays in the buffer until the corresponding buffer exit conditions are met, as described above.

Figure 6:
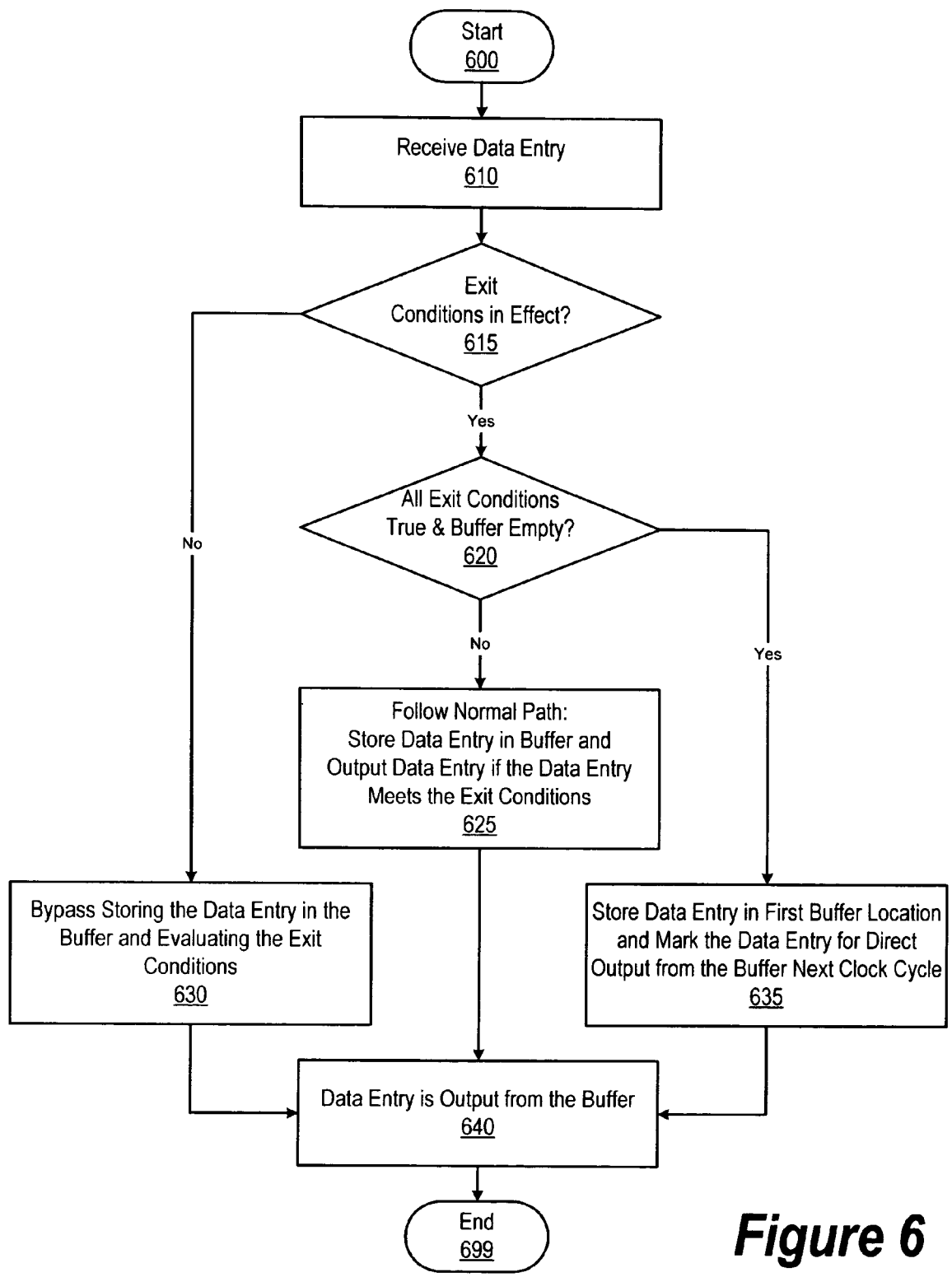
FIG. 6 is a flowchart illustrating a method for determining whether a data entry entering a shift buffer will enter the buffer, follow a first data bypass path, or follow a second data bypass path in accordance with one embodiment.

Referring to FIG. 6, a flowchart illustrating a method in accordance with one embodiment is shown. In this method, it is determined whether a data entry will enter the shift buffer, follow a first data bypass path, or follow a second data bypass path.

Processing begins at block 600 and, at block 610, a new data entry is received. A determination is then made as to whether exit conditions for exiting the buffer are in effect at decision 615. If there are no exit conditions in effect, decision 615 branches to the "no" branch, whereupon, at block 630, the buffer and any condition evaluation are bypassed. Processing subsequently continues at block 640 where the data entry exits the buffer. Processing subsequently ends at block 699.

Returning to decision 615, if exit conditions are in effect, decision 615 branches to the "yes" branch, whereupon another determination is made as to whether all the exit conditions are true and the buffer is empty (at decision 620.) If all the exit conditions are true and the buffer is empty, decision 620 branches to the "yes" branch, whereupon the data entry is stored in the first buffer location and it is designated to exit the buffer at the next clock cycle (at block 635.) Since all the conditions are true prior to the data entry entering the buffer, there is no need for the data entry to remain in the buffer while re-examining the exit conditions.

Returning to decision 620, if either not all the exit conditions are true or the buffer is not empty, decision 620 branches to the "no" branch. At block 625, the data entry begins a normal path through the buffer. That is, the data entry is held in the buffer until the data entry meets the exit conditions. Processing continues at block 640 where the data entry exits the buffer. Processing subsequently ends at 699.

While the disclosure of the present application discusses the invention in the context of multi-processor computing systems, it should be noted that the invention is more widely applicable and can be used in a variety of other contexts. Consequently, the disclosure should not be considered as limiting the invention to the field of multimedia game systems.

"Computer" and "computer system," as used herein, are intended to include any type of data processing system capable of performing the functions described herein. "Computer-readable media," as used herein, refers to any medium that can store program instructions that can be executed by a computer, and includes floppy disks, hard disk drives, CD-ROMs, DVD-ROMs, RAM, ROM, DASD arrays, magnetic tapes, floppy diskettes, optical storage devices and the like.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Those of skill in the art may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with general purpose processors, digital signal processors (DSPs), application specific integrated circuits (ASICs), field programmable gate arrays (FPGAs) or other programmable logic devices, discrete gates or transistor logic, discrete hardware components, or any combination thereof designed to perform the functions described herein. A general purpose processor may be any conventional processor, controller, microcontroller, state machine or the like. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms 'comprises,' 'comprising,' or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

What is claimed is:

1. A method comprising:
   providing a shift buffer, the shift buffer comprising a plurality of buffer locations for storing data entries;
   evaluating exit conditions for a subset of the data entries in the shift buffer,
   obtaining exit conditions results for the subset of the data entries;
   determining shift numbers for the subset of the data entries, the shift numbers being the number of buffer locations each of the subset of data entries shifted in the shift buffer while evaluating the exit conditions;
   selecting a data entry to be removed from the shift buffer based upon a corresponding exit conditions result; and
   identifying a buffer location in which the selected data entry is stored, based upon a first buffer location in which the data entry was stored upon initiation of the corresponding evaluation of exit conditions and the shift number corresponding to the selected data entry.

2. The method of claim 1, wherein the method is implemented in a bus configured to communicate the data entries to selected processors in a multiprocessor system.

3. The method of claim 1, wherein evaluating the exit conditions comprises determining a type corresponding to the data entry and determining whether a token corresponding to the type has been received.

4. The method of claim 1, further comprising outputting the selected data entry from the shift buffer.

5. The method of claim 1, further comprising receiving and storing the data entries into the shift buffer, wherein evaluating the exit conditions for the subset of the data entries in the shift buffer takes a higher number of clock cycles than receiving and storing the data entries.

6. The method of claim 5, further comprising:
   determining whether the exit conditions are in effect; and
   bypassing the receiving and storing the data entries into the shift buffer in response to the exit conditions not being in effect.

7. The method of claim 5, further comprising:
   determining whether all the exit conditions are true;
   determining whether the shift buffer is empty;
   storing the data entries in the first buffer location in response to all the exit conditions being true and in response to the buffer being empty; and
   outputting the data entry from the buffer directly from the first buffer location in response to all the exit conditions being true and in response to the buffer being empty.

8. The method of claim 1, wherein identifying the buffer location in which the selected data entry is stored comprises adding a number of the first buffer location and the shift number corresponding to the selected data entry.

9. The method of claim 1, wherein the selected data entry has the highest priority in the buffer.

10. A system comprising:
    a shift buffer, the shift buffer comprising a plurality of buffer locations for storing data entries;
    exit conditions logic coupled to the shift buffer and configured to evaluate exit conditions for a subset of the data entries in the shift buffer, and obtain exit conditions results for the subset of the data entries;
    shift logic coupled to the shift buffer and configured to determine shift numbers for the subset of the data entries, the shift numbers being the number of locations each of the subset of data entries shifted in the shift buffer while evaluating the exit conditions;
    shifted exit condition logic coupled to the exit conditions logic and to the shift logic and configured, for a selected data entry, to identify a buffer location in which the selected data entry is stored, based upon a first buffer location in which the data entry was stored upon initiation of the corresponding evaluation of exit conditions and the shift number corresponding to the selected data entry.

11. The system of claim 10, wherein the exit conditions logic is configured to evaluate the exit conditions by determining a type corresponding to the data entry and determining whether a token corresponding to the type has been received.

12. The system of claim 10, further comprising a processor bus coupled to the shift buffer, wherein the processor bus is configured to communicate the data entries to selected processors in a multiprocessor system.

13. The system of claim 10, further comprising a multiplexer configured to output the selected data entry from the buffer.

14. The system of claim 10, wherein the shift buffer is further configured to receive and store the data entries into the shift buffer, wherein the exit conditions logic takes a higher number of clock cycles to evaluate exit conditions than the buffer takes to receive and store data entries.

15. The system of claim 14, further comprising bypass logic configured to:
    determine whether the exit conditions are in effect; and
    send the data entries on data path bypass thereby bypassing the buffer receiving and storing the data entries in response to the exit conditions not being in effect.

16. The system of claim 14, further comprising bypass logic configured to:
    determine whether all the exit conditions are true;
    determine whether the shift buffer is empty;
    effect the storing of the data entries in the first buffer location in response to all the exit conditions being true and in response to the buffer being empty; and
    effect the output of the data entry from the buffer directly from the first buffer location in response to all the exit conditions being true and in response to the buffer being empty.

17. The system of claim 10, wherein the shifted exit logic is configured to identify the buffer location in which the selected data entry is stored by adding a number of a first buffer location in which the data entry was stored upon initiation of the corresponding evaluation of exit conditions and the shift number corresponding to the selected data entry.

18. The system of claim 10, wherein the selected data entry has a highest priority in the buffer.

19. A method comprising:
   providing a shift buffer, the shift buffer comprising a plurality of buffer locations for storing data entries;
   evaluating exit conditions for one or more of the buffer locations and corresponding data entries;
   enabling the data entries to shift in the shift buffer;
   selecting a first buffer location for which evaluation of the corresponding exit conditions indicates a corresponding first data entry should be removed from the shift buffer;
   determining whether the first data entry has shifted to a second buffer location; and
   removing the first data entry from the first buffer location if the first data entry has not shifted and removing the first data entry from the second buffer location if the first data entry has shifted.

20. The method of claim 19, wherein the method is implemented in a bus configured to communicate the data entries to selected slaves in a multiprocessor system.

21. The method of claim 19, wherein evaluating the exit conditions comprises determining a type corresponding to the data entry and determining whether a token corresponding to the type has been received.

22. The method of claim 19, further comprising outputting the selected data entry from the shift buffer.

23. The method of claim 19, further comprising receiving and storing the data entries into the shift buffer, wherein evaluating the exit conditions for the subset of the data entries in the shift buffer takes a higher number of clock cycles than receiving and storing the data entries.

24. The method of claim 23, further comprising:
   determining whether the exit conditions are in effect; and
   bypassing the receiving and storing the data entries into the shift buffer in response to the exit conditions not being in effect.

25. The method of claim 23, further comprising:
   determining whether all the exit conditions are true;
   determining whether the shift buffer is empty;
   storing the data entries in the first buffer location in response to all the exit conditions being true and in response to the buffer being empty; and
   outputting the data entry from the buffer directly from the first buffer location in response to all the exit conditions being true and in response to the buffer being empty.

26. The method of claim 19, wherein identifying the buffer location in which the selected data entry is stored comprises adding a number of the first buffer location and the shift number corresponding to the selected data entry.

27. The method of claim 19, wherein the selected data entry has the highest priority in the buffer.

* * * * *